United States Patent [19]

Hofmeister

[11] 4,249,252
[45] Feb. 3, 1981

[54] TIMING FREQUENCY RECOVERY

[75] Inventor: Hagen Hofmeister, Korb, Fed. Rep. of Germany

[73] Assignee: Licentia Patent-Verwaltungs-G.m.b.H, Frankfurt am Main, Fed. Rep. of Germany

[21] Appl. No.: 936,519

[22] Filed: Aug. 24, 1978

[30] Foreign Application Priority Data

Aug. 25, 1977 [DE] Fed. Rep. of Germany ....... 2738279

[51] Int. Cl.³ ............................................... H04J 3/06
[52] U.S. Cl. .................................... 370/100; 375/106
[58] Field of Search ...................... 179/15 BS, 15 BP; 178/69.1; 325/42; 370/100, 98, 74; 375/106

[56] References Cited

U.S. PATENT DOCUMENTS

| | | | |
|---|---|---|---|
| 4,015,083 | 3/1977 | Bellisio | 178/69.1 |
| 4,061,978 | 12/1977 | Motley et al. | 178/69.1 |
| 4,109,102 | 8/1978 | Yoshida et al. | 178/69.1 |

FOREIGN PATENT DOCUMENTS 1178539 of 0000 United Kingdom .
1506352 of 0000 United Kingdom .

Primary Examiner—Douglas W. Olms
Attorney, Agent, or Firm—Spencer & Kaye

[57] ABSTRACT

A method and apparatus for recovering the timing frequency in a modulated data signal receiver containing a timing frequency generator, by demodulating a received signal with the aid of carriers which are shifted by 90° in phase relative to one another to form two demodulation products, forming the sum of the squares of the two demodulation products, and determining changes in the value of that sum with respect to time to provide characteristic values which determine the adjustment criterion for the timing frequency generator.

10 Claims, 17 Drawing Figures

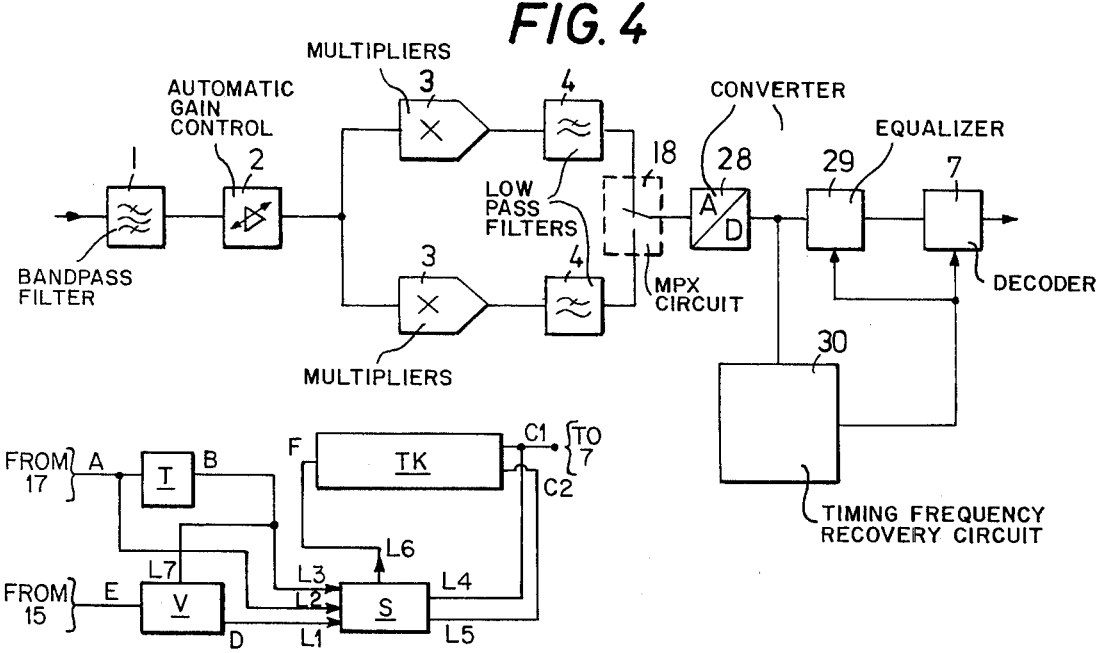
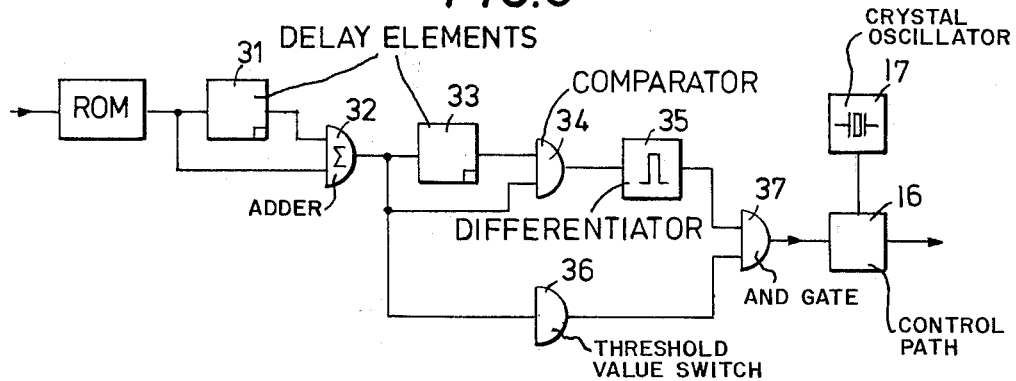

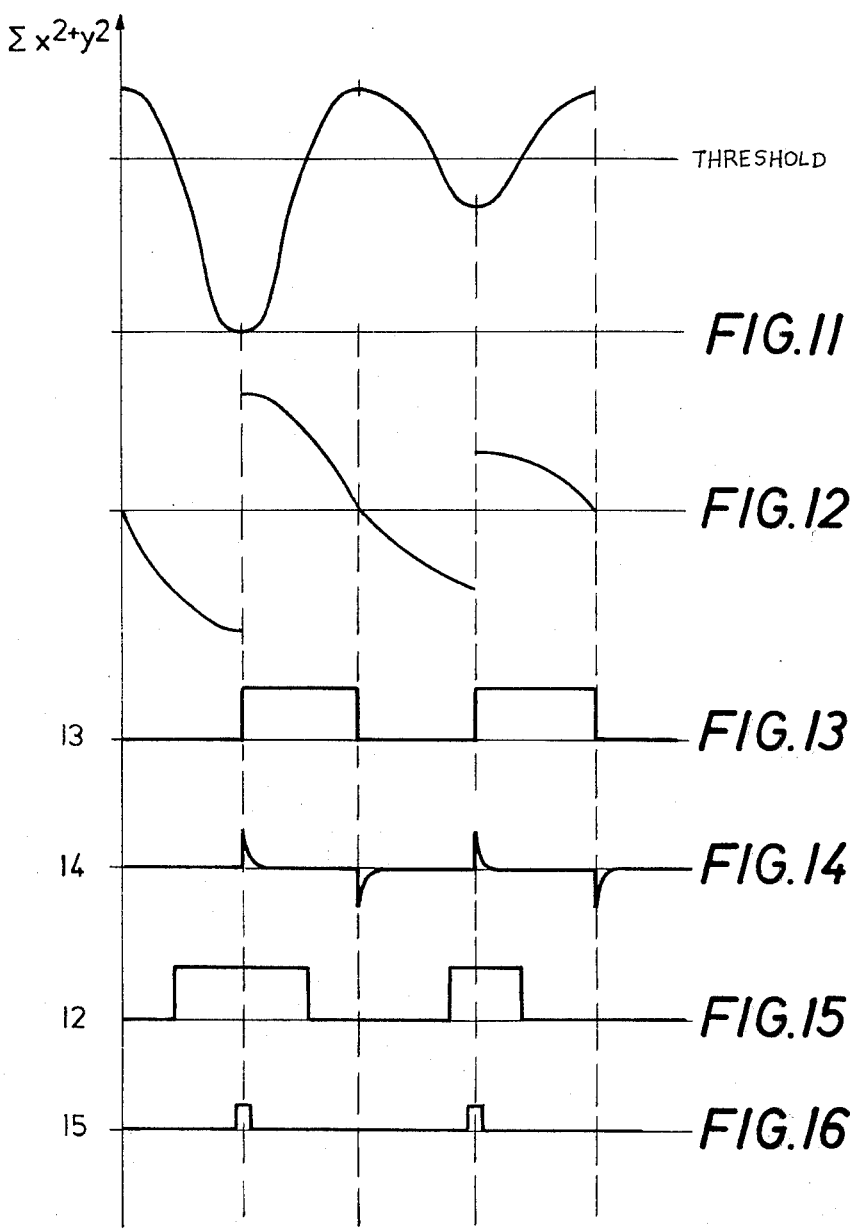

TIMING FREQUENCY RECOVERY

BACKGROUND OF THE INVENTION

The present invention relates to derivation, or recovery, of the timing frequency, or symbol rate, in modulated data signal receivers in which demodulation is effected with the aid of two carriers which are shifted by 90° relative to one another.

The receiver timing frequency can be recovered by various different procedures. For example, by means of a criterion obtained from a received signal, resonators can be excited or control loops can be corrected. A process for stepped synchronization with controllable divider chains is described in German Pat. No. 1,287,609 in which use is made of a phase control loop which is advantageous when dealing with brief losses of clock pulse information since the clock pulse generation continues with a high degree of precision if quartz oscillators are used. However, phase control loops, and even resonators, require for their control a criterion which indicates the desired phase position of the clock pulse. A technique for achieving this is described by R. D. Gitlin and F. J. Hayes in *Timing Recovery and Scramblers in Data Transmission*, THE BELL SYSTEM TECHNICAL JOURNAL, Vol. 54, No. 3, March 1975, at pp. 569-593. In the method described therein, the timing frequency is acquired from the envelope of the received signal. This process, however, is very expensive as it requires additional filters. Furthermore, when operating with nearly identical carrier and timing frequencies, the beat frequency must be converted in order to obtain the envelope curve. In addition, this process is highly sensitive to noise and distortions.

In the German periodical "Nachrichtentechnische Fachberichte", [Communication Engineering Reports], Vol. 37, 1969, Datenuebertragung [Data Transmission] VDE Verlag, Berlin, at pp. 271-279, in an article entitled "A Four-Phase Modem for 2400 Bits per Second" by J. Haas, there is described a method in which the timing frequency is derived directly from the demodulated signals. This method works well only if applied with differentially coherent demodulation. If coherent demodulation is effected by means of a recovered carrier, the control circuit may become dependent on the timing frequency and the carrier, which will lead to reduced adjustment speeds.

SUMMARY OF THE INVENTION

It is an object of the present invention to provide a control criterion with which to identify and control a timing frequency with a minimum of expenditure.

These and other objects are achieved by a method for recovering the timing frequency in a modulated data signal receiver containing a timing frequency generator, which method includes: demodulating a received signal with the aid of carriers which are shifted by 90° in phase relative to one another to form two demodulation products; forming the sum of the squares of the two demodulation products; and determining changes in the value of that sum with respect to time to provide characteristic values which determine the adjustment criterion for the timing frequency generator.

The present invention offers the advantages, inter alia, that: no additional filters are required since the filters already provided in the receiving path are used and shared; the timing frequency criterion is subjected to exactly the same delay by the circuitry as the actual data signal; and the acquisition of the receiver timing frequency is independent of the phase position and frequency of the demodulation carrier.

BRIEF DESCRIPTION OF THE DRAWINGS

FIG. 4 is a block circuit diagram of a second embodiment of a receiver according to the invention.

FIG. 5 is a block circuit diagram of a third form of construction of the timing frequency control.

FIG. 11 is the sum of the squares of the time characteristics of channels x and y.

FIG. 12 is the output of differentiator 11 of FIG. 2.

FIG. 13 is the output of limiter 13 of FIG. 2.

FIG. 14 is the output of differentiator 14 of FIG. 2.

FIG. 15 is the output of switch 12 of FIG. 2.

FIG. 16 is the output of And member 15 of FIG. 2.

FIG. 17 is a block circuit diagram of one suitable, known embodiment of a component of the circuit of each of FIGS. 2, 3 and 5.

DESCRIPTION OF THE PREFERRED EMBODIMENTS

Figure 1:
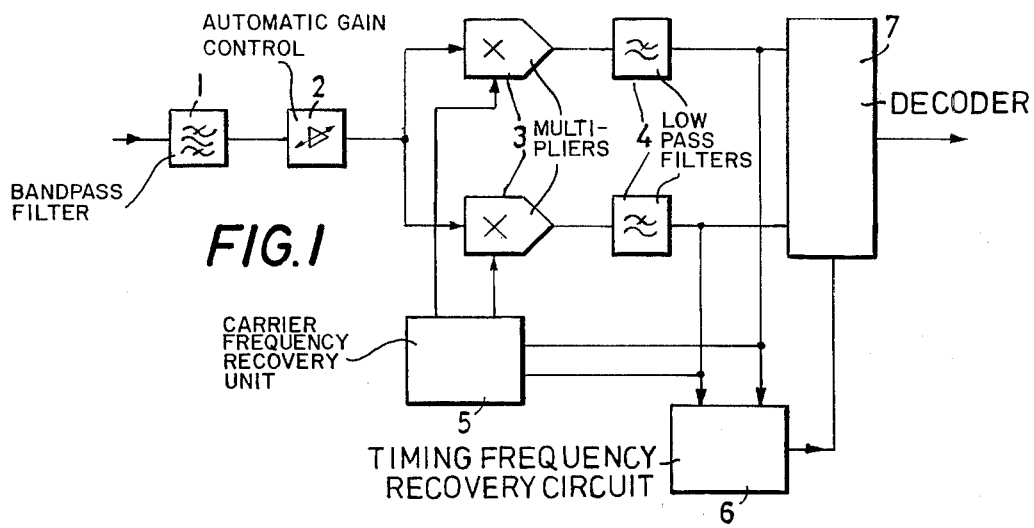
FIG. 1 is a block circuit diagram of a receiver operating according to a preferred embodiment of the invention.

The receiver shown in FIG. 1 represents one embodiment of a receiver constructed to operate according to the invention. For example the receiver could be used to receive signals as described in recommendations V26, V26 bis, V27, V27 bis and V27 ter Orangebook Vol. VIII 1976 of the Comite Consultatif International Telegraphique et Telephonique (CCITT), Genf.

The phase modulated signals emitted over the transmission path are led to one input of each of two multipliers 3 by way of a bandpass filter 1 and a control amplifier 2 having an automatic gain control. The other input of each multiplier 3 receives a signal derived from the regenerated carrier, the signal to one multiplier being representative of the sign of sin wt and the signal to the other multiplier being representative of the sign of cos wt, where w is the carrier radian frequency. Thus, the carrier frequency representative signals to the two multipliers are in quadrature to one another. Element 5 is carrier frequency recovery unit as described in the German patent DE-PS No. 15 12 561.

After the sifting out of the unwanted modulation components and pulses shaping by means of low pass filters 4, the x and y Cartesian coordinates of the voltages representing the phase plane are entered into a decoder 7. The x and y values are also entered into a timing frequency recovery circuit 6. A form of decoder 7 especially for 4-phase shift keyed signals as described in CCITT V26 is described in the German patent DE-PS No. 12 22 103.

Figure 2:
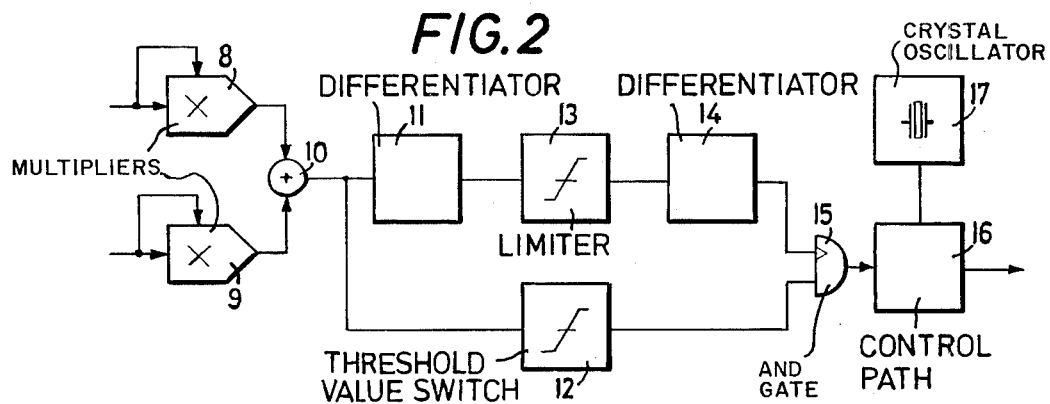
FIG. 2 is a block circuit diagram of one form of construction of the timing frequency control according to the invention.

FIG. 2 depicts one embodiment of such a timing frequency recovery circuit. The x and y values of the two channels are squared in the multipliers 8 and 9 in that the x value is fed to both inputs of one multiplier and the y value is fed to both inputs of the other multiplier. The squared values are then added in a summing circuit 10. The first time derivative of the summed signal is then formed in a differentiator 11, the differentiated signal is then limited in a limiter 13 and the resulting limited signal is subjected to a second time differentiation by a differentiator 14.

The summed signal from circuit 10 is also fed to a threshold value switch 12 which provides an output when the signal from circuit 10 falls below a predetermined value. Element 13 is a limiter which output shows the sign of its input value. Element 12 changes the sign of its output value if the input value is lower or higher than a threshold.

The outputs from differentiator 14 and switch 12 are connected to the inputs of an AND member 15 which supplies a comparison signal to a control path 16 when a positive pulse is being produced at the output of differentiator 14 at the same time that switch 12 is producing an output indicating that the signal from circuit 10 is below the predetermined value. An oscillator 17 is connected to another input of control path 16 and the output of control path 16 is connected to decoder 7, as shown in FIG. 1. The output of the And-member 15 delivers binary "1" for a short time period if the output of element 12 shows that its input value is lower than a threshold and the output of the differentiator delivers a positive pulse.

One suitable embodiment of control path 16 is illustrated in FIG. 17. The control path is composed of the following units: a divider stage T; a divider cascade TK; an arrangement V for producing comparison pulses; and a control circuit S.

The control path operates as follows: binary signals received from gate 15 of FIG. 2 travel via input E to the arrangement V for generating comparison pulses. In arrangement V differentiation of the pulse edges, or zero passages, produces comparison pulses, which appear at the output D and are fed to a first input L1 of the control circuit S. A second input L2 of circuit S is connected to the output of oscillator 17 (FIG. 2) via an input A of the control path. A third input L3 of circuit S is connected to the output B of bistable divider stage T, the input of which is connected to input A of the control path, to receive a signal at one-half the frequency of the output of oscillator 17. Two further inputs L4 and L5 of the control circuit are connected to mutually complementary outputs C1 and C2 of the divider cascade TK. One of the two outputs of the divider cascade, for example the output C1, must now furnish, as known, a clock pulse frequency for the signal receiver, which clock pulse frequency is generally the same as the clock pulse frequency of the remote signal transmitter and, in addition, has a fixed phase position with respect to the zero passages of the binary signals. In the illustrated embodiment, the change from positive to negative polarity at the output C1 of the divider cascade TK is assumed to coincide with the zero passages of the data signals from minus to plus. Normally, the input F of the divider cascade TK, which is connected to the output L6 of the control stage S, receives the signal at output B of the bistable divider stage T which is present at the input L3 of the control stage S. If now a comparison pulse appears at the input L1 of the control circuit S at a time when the output C1 of the divider cascade TK has a positive potential, the control stage S will place the signal from oscillator 17, which it receives at its input L2, at the input F of the divider cascade TK for the duration of the comparison pulse, so that the divider cascade now counts at double its normal frequency. If, however, the comparison pulse occurs at a time in which the output C1 of the divider cascade TK has a negative potential, then the control circuit S blocks its output L6 for the duration of the comparison pulse so that during this time the divider cascade TK is not switched over at all. In both cases, the signal at output B of the divider stage T is again placed at the input F of the divider cascade TK when the comparison pulse has ended. Oscillator 17 could be any simple crystal oscillator with a fixed frequency.

Figure 3:
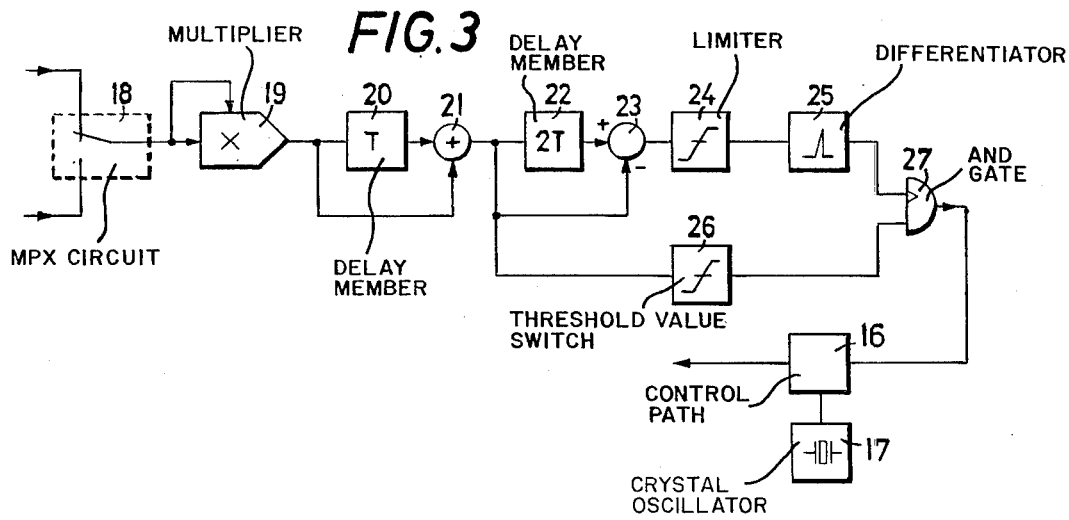
FIG. 3 is a block circuit diagram of a second form of construction of the timing frequency control according to the present invention.

FIG. 3 shows another version of the timing frequency recovery circuit. In this case the two channels are scanned in rapid alternation by a multiplex circuit 18. After the multiplex signal has been squared in a multiplier 19, the output signal from multiplier 19 is added in a summing circuit 21 to the multiplier output signal delayed by the switching time T in a delay member 20. The time T has the value of $T = 1/2 f_s$, whereby $f_s$ is the scanning frequency. This scanning rate is a multiple of the baud rate of the receiver. As an example the multiple could be 10.

The sum that appears at certain times at the output of circuit 21 is subtracted in a difference member 23 from the sum signal that has been delayed by 2T in a delay member 22. The output from member 23 is supplied to a limiter 24 and a differentiator, or pulse former, 25.

The output from circuit 21 is further supplied to a threshold value switch 26 and the outputs of differentiator 25 and switch 26 are connected to the inputs of an AND-circuit 27 which supplies a comparison pulse edge to control path 16. Elements 24–27 correspond essentially to elements 13, 14, 12 and 15, respectively, of FIG. 2.

In the receiver shown in FIG. 4, the demodulation described with reference to FIG. 1 is followed by a multiplexer 18 and an analog-digital converter 28. The output of converter 28 is supplied to a digitally adaptable distortion corrector, or equalizer, 29 and timing frequency recovery circuitry 30. The analog to digital converter 28 is preferable an 8 bit ADC in an conventional form as it is technical standard. One form of an adaptive distortion corrector 29 is described in German patent DE-PS No. 20 40 039.

FIG. 5 shows one suitable embodiment of circuitry 30 at the input of which appears a signal x or y which is alternatively scanned and digitalized rapidly in succession and supplied to a read-only memory ROM as an address. The memory ROM contains a list of the squares of the scanned values.

The remainder of this circuitry corresponds to a digital version of the circuit shown in FIG. 3. The output of the ROM is coupled to the input of a delay element 31 and to one input of an adder 32. The output of of delay element 31 is connected to the other input of adder 32. The output of adder 32 is connected with the input of a further delay element 33, one input of a comparator 34, and the input of a threshold value switch 36. The output of the delay element 33 is connected to the other input of comparator 34. The output of comparator 34 is connected to the input of a differentiating element 35. The output of differentiating element 35 is connected to one input of an AND-circuit 37 and the output of the threshold value switch 36 is connected to the other input of AND-circuit 37. The output of AND-circuit 37 is connected to the input of a control path 16. At the other input of the control path 16 there is connected an oscillator 17. The output of control path 16 provides the timing frequency for the receiver circuit of FIG. 4.

Element 31 and 33 are n-bit (preferable 8 bit) parallel shift registers with a delay of $T=1/2fs$ in element 31 and $2T$ in element 33.

Element 34 is a comparator which delivers a binary "1" if the output of element 32 shows a higher value than the output of element 33.

Element 35 derives from every positive going edge a small positive pulse.

Element 36 delivers a binary "1" if the value at its input is lower than a threshold.

Element 37 is a binary And member.

For better understanding a description of the operation of FIG. 2 is given below.

Figure 6:
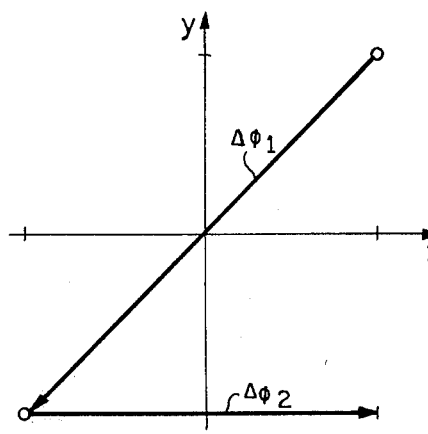
FIG. 6 is an example of a phase pattern.
Figure 7:
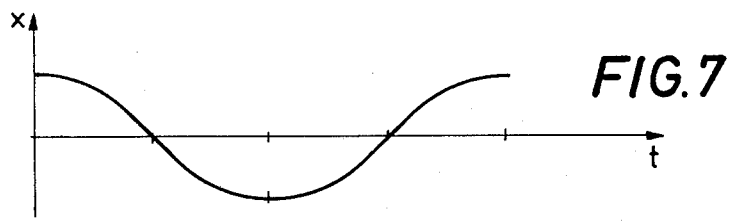
FIG. 7 is the time characteristic of the inphase channel x of the phase pattern of FIG. 6.
Figure 8:
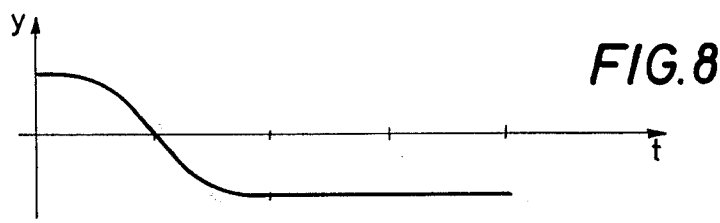
FIG. 8 is the time characteristic of the quadrature channel y of the phase pattern of FIG. 6.

An example of a phase pattern to be received is given in FIG. 6 for a signal sequence which undergoes a first phase change ($\Delta\phi_1$) of 180° and a second phase change ($\Delta\phi_2$) of +90°. After demodulating and pulse shaping the x and y values are entered into the timing frequency recovery circuit of FIG. 2. The corresponding time characteristics of x and y channels to the phase pattern given in FIG. 6 are shown in FIGS. 7 and 8.

Figure 9:
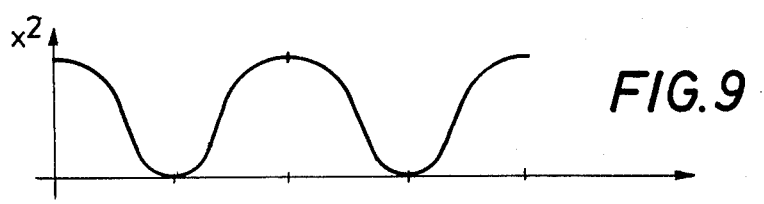
FIG. 9 is the square of the time characteristic of channel x.
Figure 10:
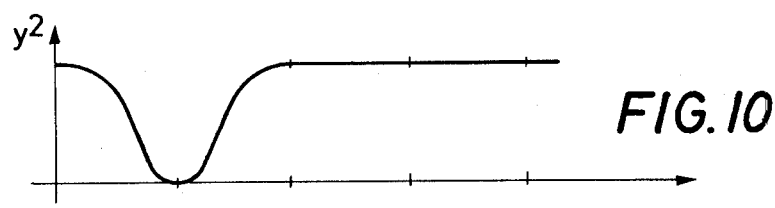
FIG. 10 is the square of the time characteristic of channel y.

These signals are squared in elements 8 and 9 and summed up in element 10. The corresponding time characteristics are shown in FIGS. 9, 10 and 11.

FIG. 12 shows the output of differentiator 11 and FIGS. 13 and 14 the outputs of limiter 13 and differentiator 14.

FIG. 15 shows the output of threshold value switch 12 if the threshold has a value as shown in FIG. 11.

In And-member 15 the outputs of differentiator 14 and threshold value switch 12 are anded.

The output of element 15 is shown in FIG. 16.

The output pulses of element 15 are used in control path 16 to synchronize the receiver baud clock.

In this description the minima of the values of the sum of the squares of x and y channels are used to synchronize. If the maxima are to be used, the And-member 15 must have a positive output pulse "1" when the output of element 12 is low and the output pulses of element 14 are negative.

It will be understood that the above description of the present invention is susceptible to various modifications, changes and adaptations, and the same are intended to be comprehended within the meaning and range of equivalents of the appended claims.

What is claimed is:

1. A method for recovering the timing frequency in a modulated data signal receiver containing a timing frequency generator, comprising: demodulating a received signal with the aid of carriers which are shifted by 90° in phase relative to one another to form two demodulation products; forming the sum of the squares of the two demodulation products; and determining changes in the value of that sum with respect to time to provide characteristic values which represent the adjustment criterion for the timing frequency generator.

2. A method as defined in claim 1 wherein said step of determining is carried out to provide the maximum and minimum of the sum of the squares of the two demodulation products as the adjustment criterion.

3. A method as defined in claim 2 wherein said step of determining comprises ascertaining that the maximum of the sum of the squares of the two demodulation products exceeds a predetermined value or that the minimum of the sum of the squares of the two demodulation products lies below a predetermined value to provide an additional adjustment criterion.

4. A method as defined in claim 3 where said step of determining comprises comparing a signal representing the sum with the same signal delayed in time to provide the maximum and minimum of the sum.

5. A method as defined in claim 4 wherein said step of forming the sum comprises scanning the two demodulation products in rapid alternation and forming the squares of the two products by time division multiplexing.

6. A method as defined in claim 1 further comprising, before said step of forming, converting each demodulation product from analog to digital form.

7. A method as defined in claim 6 wherein said step of forming comprises preliminarily storing a representation of the square of each demodulation product value in a memory.

8. Apparatus for recovering the timing frequency in a modulated data signal receiver containing a timing frequency generator, a demodulator for demodulating a received signal with the aid of carriers which are shifted by 90° in phase relative to one another to form two demodulation products, and a converter connected to receive successive values of the two demodulation products in alternation and generating a digital representation of each successively received value, said apparatus comprising: a read-only memory containing a representation of the square of each demodulation product and connected to receive the digital representations of the successive demodulation product values; a first time delay member having its input connected to the output of said memory; a summing member having a first input connected to the output of said memory and a second input connected to the output of said first delay member; a second time delay member having its input connected to the output of said summing member; a comparator having a first input connected to the output of said summing member and a second input connected to the output of said second delay member; a differentiating member having its input connected to the output of said comparator; a threshold value switch having its input connected to the output of said summing member; an AND-circuit having a first input connected to the output of said differentiating member and a second input connected to the output of said threshold value switch; an oscillator; and means defining a control path having a first input connected to the output of said AND-circuit and a second input connected to said oscillator, with the output of said control path providing the timing frequency for the receiver.

9. Apparatus for recovering the timing frequency in a modulated data signal receiver containing a timing frequency generator and a demodulator for demodulating a received signal with the aid of carriers which are shifted by 90° in phase relative to one another to form two demodulation products, said apparatus comprising: first and second multipliers each having both of its inputs connected together to receive a respective one of the demodulation products in order to provide an output representing the square of the demodulation product which it receives; summing means having inputs connected to the outputs of said multipliers; a first differentiator having its input connected to the output of said summing means; a limiter having its input connected to the output of said first differentiator; a second differentiator having its input connected to the output of said limiter; a threshold value switch having its input connected to the output of said summing means; an AND-circuit having a dynamic input connected to the output of said second differentiator and a static input connected to the output of said threshold value switch; a quartz oscillator; and means defining a control path having one input connected to the output of said AND-circuit and another input connected to said oscillator and having an output providing the timing frequency for the receiver.

10. Apparatus for recovering the timing frequency in a modulated data signal receiver containing a timing frequency generator and a demodulator for demodulating a received signal with the aid of carriers which are shifted by 90° in phase relative to one another to form two demodulation products, said apparatus comprising: time multiplexing means connected to sample the two demodulation products alternatingly and successively at a given rate; a multiplier having both inputs connected to the output of said multiplexing means to provide an output signal representative of the square of the demodulation product currently being sampled; a first time delay member having its input connected to the output of said multiplier; a summing member having a first input connected to the output of said first delay member and a second input connected to the output of said multiplier; a second time delay member having its input connected to the output of said summing member; a subtraction member having one input connected to the output of said second delay member and its other input connected to the output of said summing member; a limiter having its input connected to the output of said subtraction member; a differentiator having its input connected to the output of said limiter; a threshold value switch having its input connected to the output of said summing member; an AND-circuit having a dynamic input connected to the output of said differentiator and a static input connected to the output of said threshold value switch; an oscillator; and means defining a control path having one input connected to the output of said AND-circuit and another input connected to said oscillator and having an output providing the timing frequency for the receiver.

* * * * *